Figure 1:
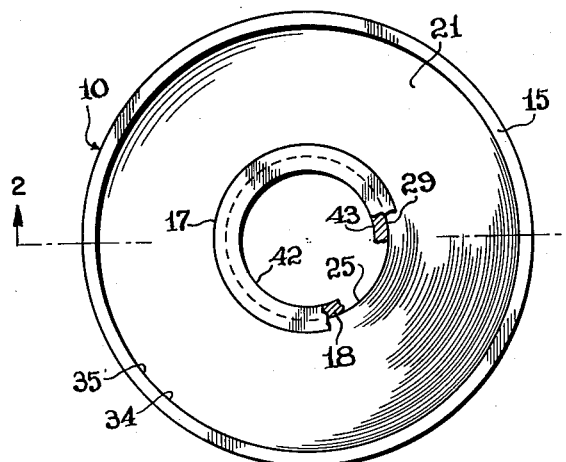

March 5, 1963 — H. ORNER — 3,080,160

SPRING MECHANISM

Filed Dec. 23, 1960

INVENTOR
Harry Orner

United States Patent Office 3,080,160
Patented Mar. 5, 1963

3,080,160
SPRING MECHANISM
Harry Orner, 2479 Glen Canyon Road, Altadena, Calif.
Filed Dec. 23, 1960, Ser. No. 78,055
15 Claims. (Cl. 267—1)

This invention relates to a spring mechanism, and more particularly to a new and improved device of this type operable to convert a force into radial displacement of a resilient annular element.

This invention is a continuation-in-part of my copending application, Serial Number 27,591; filed May 9, 1960; for Spring Mechanism. Reference is also made to copending application, Serial Number 188,112, filed April 17, 1962; for Spring Mechanism.

Spring mechanisms are required in a great variety of applications having need to absorb and release energy. A spring may be defined as an elastic body whose primary function is to deflect or distort under load and which recovers to its original shape when released after being distorted. Such springs come in various forms using various means of stressing resilient material. All springs have the primary consideration of load and deflection which is the mathematical function of the energy stored therein.

An ideal spring would consist of a simple straight bar of uniform section subject to an axial load at its end. Since the bar is loaded axially the stress distribution across the section is uniform and for this reason it represents the optimum energy stored per unit volume of material. The tension yield point would be considered the limiting stress and the deflection would vary with the length of the bar. If the bar is subjected to fatigue or repeated loading the stress at the endurance limit would be limited by the stress concentration present near the end of the bar where it would be clamped or changed in section. This would reduce the ideal maximum load and deflection for practical use. Such springs are subjected to this and other disadvantages outstanding among which are the limited deflection to the length of the bar. Springs of other forms use means for increased deflection at a large sacrifice of the maxium allowable load.

In modern spring applications the requirement of providing for high energy capacities is limited to such structures that are of large bulk and weight. To overcome many of these problems, use has been made of liquid springs, consisting of a cylinder-piston structure using the compressibility of a liquid for the spring element. The disadvantages of these liquid springs are: high cost, sealing problems, limited temperature range, load variation due to temperature changes, mounting limitations, and complexity of structure.

The present invention provides a spring mechanism obviating the foregoing major disadvantages and others as will be apparent by the following disclosure. In lieu of the bar in any of the forms of former designs or the liquid, this invention employes an annular spring element and uses the displacement in circumferential stress of this element to get a variety of designed deflection relationships at high values of load.

It is the primary object of this invention to provide an improved spring mechanism of relative high values of energy capacities.

Another object of this invention is to provide a spring mechanism utilizing all the spring material in hoop stress.

Another object of this invention is to provide a spring mechanism wherein the spring element is annular in shape and is displaced radially.

Another object of this invention is to provide a high load spring member that can be mounted concentrically with a shaft.

Another object of this invention is to provide a spring mechanism using a spring element consisting of an annular member made by circumferentially winding fiber, and impregnating the fiber with a plastic material.

Another object of this invention is to provide a spring mechanism that can be adapted for use in extreme temperature ranges.

Another object of this invention is to provide a spring mechanism that has minimum load variation due to temperature changes.

Another object of this invention is to provide a spring mechanism that can be used to stress the deformable spring material to the elastic limit.

Another object of this invention is to provide a spring mechanism adaptable to provide low hysteresis losses.

Another object of this invention is to provide a method of transposing the energy of an axial directed force into radial displacement of an element.

Another object of this invention is to provide an article of manufacture of simple construction for economical fabrication.

Figure 5:
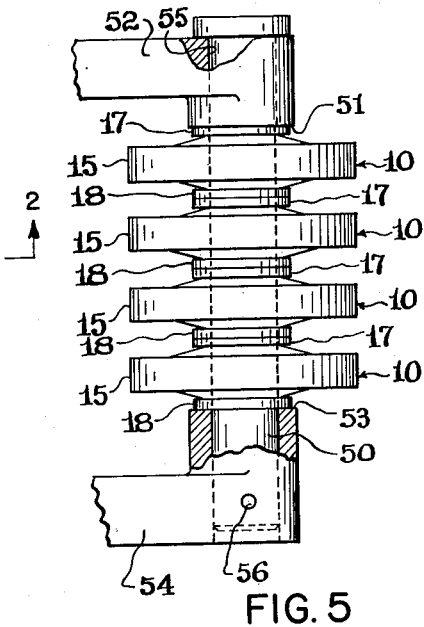
Figure 2:
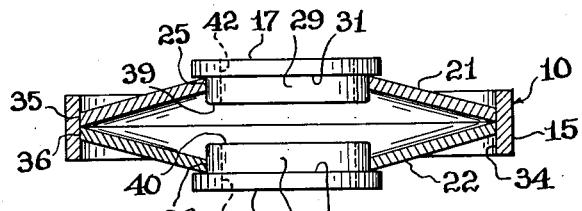
Figure 3:
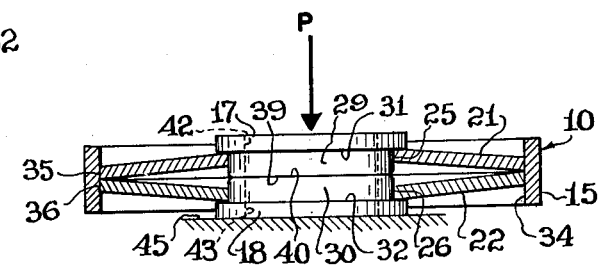
Figure 4:
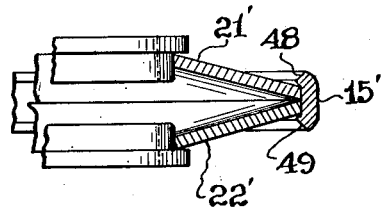

Other objects of this invention will become fully apparent as reference is had to the accompanying drawings wherein my invention is illustrated and which:

FIGURE 1 illustrates a plan view of a preferred form of my invention with a portion broken away, FIGURE 2 is a sectional view taken on plane 2—2 of FIGURE 1, FIGURE 3 is a view similar to FIGURE 2 but in an alternate relative position, FIGURE 4 is a fragmentary view of a modified form of my invention, FIGURE 5 is an elevational view illustrating the mounting of my invention on a shaft member.

The spring mechanism 10 shown in FIGURES 1 and 2, consists of a spring element in the form of a ring 15, taking the elastic tensile stress. The wall section of the ring 15 should be made uniform along its entire circumference for maximum elongation, but this invention is not limited to this construction as will be explained later.

The ring 15 can be made of any material such as heat treated spring material, aluminium, plastic, to suit a specific requirement, but a material of the minimum rigidity may be more ideally suited to attain a maximum load to volume relationship. Reinforced glass fiber may be used to great advantage because of its unique combination of high stress limit and tensile strength. In the ring 15, glass fiber would be wound around a mandrel in a circular direction for maximum tensile strength. From tests on pressure vessels it was found that glass-reinforced plastic actually represents a spring material of unique properties for the following reasons: Glass filament has a modulus of elasticity in tension of about 10,000,000 p.s.i. and an elastic elongation from 3% to 4%, resulting in an elastic limit from 300,000 to 400,000 p.s.i.

Such unidirectional glass fiber structures were found to have a moduli of elasticity in the range from 3,000,000 to 6,000,000 p.s.i., depending on the pattern of winding and glass density. The elastic limit of strain is upward of 3% or .030 inch per inch, and the tensile strength up to 200,000 p.s.i. have been measured in the direction of the fiber.

Within the ring 15 is a pair of bushings 17, 18, concentrically located. Force transfer members in the form of dished disk springs 21, 22, with center holes 25, 26, respectively, contact the respective bushings at the reduced diameters 29, 30, which form radial shoulders 31, 32, respectively.

The transfer members 21, 22, may be made in the form of the commonly known dished springs or often referred to as Belleville springs which as an element in itself constitutes a spring structure. These dished disk springs 21, 22, extend to the inside diameter 34 of ring 15, at their outer circumferential edges 35, 36, respectively, laying in close proximity to each other, with their circumferential edges in contact.

Each of the bushings 17, 18, are held in place in the holes 25, 26, respectively, by a press fit, or can be further secured by peening or upsetting the reduced diameter 29, 30. The inner ends 39, 40, respectively, of bushings 17 and 18 act as abutting members, see FIGURE 3, when the spring mechanism 10 is fully actuated. In this respect the length of the bushings 17 and 18, from the shoulders 31 and 32 to the ends 39, 40, respectively, may be a factor in the design of the spring mechanism 10, as will be explained later.

The dished disk springs 21 and 22, along the outer circumferential edges 35 and 36, respectively, are press fitted into the inside diameter 34 of ring 15, thus this constitutes a unitary assembly. Holes 42 and 43, in the center of bushings 17 and 18, respectively, form a concentrically alined pair of holes for mounting the spring mechanism 10 on a desired shaft structure or similar provided member.

In operation, a load or force P, see FIGURE 3, is applied axially on the bushing 17, bushing 18 being retained stationary by means of an abutment 45, the bushing 17 is moved axially toward bushing 18 until the respective inner ends 39 and 40 contact, which is the limit of deflection of the spring mechanism 10. The disk springs 21 and 22 take a flatter shape with an increase in the outer circumferential edges of 35 and 36, respectively. This action stresses the ring 15 along its entire circumference. The limit of strain of the ring 15 is its elastic limit.

Thus the ring 15 takes an elastic deformation, and when load P is removed, the ring 15 tends to regain its original circumference forcing the dished disk springs 21 and 22 back to their original position, thereby moving bushing 17 back to the position illustrated in FIGURE 2.

The dished disk springs or Belleville springs 21 and 22, when used in the structure of spring mechanism 10, are greatly supplemented by the ring element 15. In many cases of high loading values, the resilience of the dished disk springs may be of small consideration. The dished disk spring structure may be slotted radially, if desired, to reduce its spring loading value as is commonly known to the art.

The spring mechanism 10 has a characteristic which makes it adaptable for accurate fabrication when ring 15 is stressed beyond the elastic limit of the material as the ends 39 and 40 come into contact. The ring 15 stressed beyond its elastic limit will take a permanent set when the force P is removed, and thus when the ring 15 is again stressed to the same posiiton, the new elastic limit will now be at this point. Thereafter the ring will be stressed up to the elastic limit when ends 39 and 40 again contact. Thus this provides a method of attaining a spring mechanism to deflect right up to the elastic limit of the material of ring 15. This will be true only for material which can be stressed beyond the elastic limit, to take a permanent set, such as steel, aluminum, or most of the metals. In other materials which can not be stressed beyond the elastic limit, to take a permanent set, such as some glass wound fiber reinforced in plastic, the spring mechanism 10 must be designed to be stressed within its elastic limit when ends 39 and 40 make contact. In either case the danger of over stressing the spring mechanism 10 is stopped by the contacting of the ends 39 and 40.

The ring 15 is preferably made continuous and of equal cross-section around its entire circumference to attain the maximum elongation at the maximum stress. However for economical consideration where uses are less critical, the ring 15 may be fabricated by rolling sheet material into rings with a seam that may be welded or brazed in any desired manner.

The spring mechanism 10 can be fabricated by various economical methods. The ring 15 can be machined from tubing, stamped from sheet metal, spun from sheet metal, or forged. The dished disk springs 21 and 22, can be stamped or spun from sheet metal. All component parts of the spring mechanism 10 are round in configuration which lends itself to fabrication at an economical consideration.

An important aspect of the spring mechanism 10 is that it can be fabricated completely out of material that can be used for high temperature environment. For example a spring mechanism 10 was completely fabricated from a material which has very good temperature characteristics ranging from yield strength of 215,000 p.s.i. at 70 degrees F. to 207,000 p.s.i. at 900 degrees F. This material machines well and can be spun or cold formed.

The ring spring element 15 in the spring mechanism 10 is assembled on the dished disk springs 21 and 22, by a press fit which has been found to work satisfactorily. A modified form of the ring can be made as illustrated in FIGURE 4. The ring 15', as shown, can have its edges crimped over along the circumferential ends 48 and 49, over the outer circumferential edges of the dished disk springs 21' and 22', to form a secure assembly. If the edges are small in area and at a relatively small angle to the ring, they will have relatively little effect on the characteristic of the spring mechanism 10'.

Another important characteristic is that this spring mechanism has no frictional sliding surfaces. The rings 15 and 15', are freely suspended from contacting any bearing surfaces, such as for example, the abutment 45 in FIGURE 3. Thus this spring construction is adaptable for use in dynamic or repeated loading where low hysteresis losses are a requirement.

The use of these spring mechanisms 10 and 10' can be made as single units as explained above, but extended use can be made by using a number of such units in a single assembly as illustrated in FIGURE 5. Four spring mechanisms 10 are mounted on a shaft member 50 passing through each of the holes 42 and 43, of the bushings 17 and 18, respectively. The bushings 17 contacting the bushings 18 with the upper spring mechanism 10 having the bushing 17 contact a shoulder 51 of a frame member 52 of a heavy equipment. The lower-most spring mechanism 10 having the bushing 18 contact a shoulder 53 of a base member 54. Shaft 50 is free to slide in bushings 17 and 18, and in the inside diameter 55 in member 52. A force downward on frame member 52 will cause a deflection in the cavalcade of spring mechanisms 10. The rings 15 of the spring mechanisms 10 may be made of the same dimensions to give an increased deflection value for a load such as force P. Also the rings 15 may be of different dimensions to get any desired load characteristics. If one of the spring mechanisms 10 is designed to carry a lighter load and when that load is exceeded it will bottom by contacting of the bushing ends 39 and 40, and the other stronger spring mechanisms 10 will continue carrying the excess load.

This form of mounting the spring mechanisms 10 makes it an economical construction in the equipment in which it is to be used, since no special provisions are required other than a shaft member.

Thus illustrated above is a simple structure spring mechanism 10 and 10', which makes use of dished disk springs to stress a resilient ring, and can be used in a number of different ways to suit an unlimited range of load and deflection relationship.

While these particular spring mechanisms and method of predetermining its characteristics herein shown and disclosed in detail are fully capable of attaining the objects and providing the advantages therebefore stated, it is to be understood that they are merely illustrative of the present preferred embodiment of the invention and that no limitations are intended to the details of construction or design herein shown other than as defined in the appended claims.

In the claims:
1. In a spring mechanism, a resilient ring, a pair of dished disk springs with their respective dished faces toward each other mounted in said resilient ring with their respective outer circumferential edges abutting the inner circumferential wall of said resilent ring, a hole in each of said dished disk springs concentrically with said outer circumferential edges, a bushing fitted into each of said holes of said dished disk springs, a radial shoulder on said bushings contacting each of said dished disk springs at the internal circumferential edges of said holes, to thereby cause any axial force on said bushings to deform said dished disk springs to radially force said resilient ring into hoop stress.

2. The invention in claim 1, in which said bushings extend axially with radial ends adapted to contact each other, to limit said deformation of said dished disk springs.

3. The invention in claim 2, in which said resilient ring is stressed beyond the elastic limit in hoop stress when said radial ends of said bushing initially contact.

4. In a spring mechanism, a resilient ring element, a pair of dished disk members concentrically located within said resilient ring element with their external circumferential edges abutting the internal circumferential wall of said ring element, means to actuate the displacement of said dished disk members axially, to thereby cause said external circumferential edges of said dished disk members to increase radially to stress said resilent ring element in hoop stress, said dished disk members are mounted in said resilient ring element with their respective external circumferential edges in close proximity to each other, the circumferential ends of said resilient ring are flanged over said outer circumferential edges of said dished disk members to form a unitary assembly.

5. In a spring mechanism, a resilient ring element, a pair of dished disk members concentrically located within said resilient ring element with their external circumferential edges abutting the internal circumferential wall of said ring element, means to actuate the displacement of said dished disk members axially, to thereby cause said external circumferential edges of said dished disk members to increase radially to stress said resilient ring element in hoop stress, said dished disk members mounted in said ring element with their respective external circumferential edges in close proximity to each other, in which each of said dished disk members have concentric holes adaptable to be mounted on a shaft member, bushings mounted in the respective said holes of said dished disk members in such manner that their respective ends are adapted to contact to limit the axial displacement of the dished disk members.

6. The invention in claim 5, in which the resilient ring element is stressed in hoop stress beyond the elastic limit of the material when the inner ends of the respective said bushings initially contact.

7. In a spring mechanism, a resilient ring element, a pair of dished disk members concentrically located within said resilient ring element with their external circumferential edges abutting the internal circumferential wall of said ring element, means to actuate the displacement of said dished disk members axially, to thereby cause said external circumferential edges of said dished disk members to increase radially to stress said resilient ring element in hoop stress, said dished disk members are mounted in said resilient ring element with their respective external circumferential edges in close proximity to each other, said resilient ring element is formed of fiber wound in a circular direction and reinforced in a solid material.

8. In a spring mechanism, a resilient ring, a pair of frusto-conical members with their respective hollow faces toward each other mounted in said resilient ring, with their respective outer circumferential edges abutting the inner circumferential wall of said resilient ring, a hole in each of said frusto-conical members concentrically with their outer circumferential edges, a shoulder member fitted into each of said holes of said frusto-conical members, a radial shoulder on said shoulder members contacting each of said frusto-conical members at the inner circumferential edges of said holes, to thereby cause any axially applied force on said shoulder members to deform said frusto-conical members to radially force said resilient ring into hoop stress.

9. In a spring mechanism, a resilient ring element, a frusto-conical member concentrically located within said resilient ring element, an external circumferential edge of said frusto-conical member abutting an internal circumferential wall of said resilient ring element, a bushing member, an annular shoulder on said bushing member, an internal circumferential edge of said frusto-conical member abutting the external circumferential wall of said bushing radially, and an area at said internal circumferential edge of said frusto-conical member abutting said annular shoulder axially, means to actuate the displacement of said frusto-conical member axially, by the movement of said bushing member axially to thereby cause said external circumferential edge of said frusto-conical member to increase radially to stress said resilient ring element in hoop stress.

10. The invention as claimed in claim 9, in which said bushing includes an annular end area at the opposite extreme end of said annular shoulder, an abutment for said annular end area spaced a predetermined distance from said annular end area of said bushing, said bushing movable toward said abutment relative to the hoop stress in said resilient ring element until limited by the abutment of said annular end area on said abutment.

11. The invention as claimed in claim 9, in which said resilient ring element is formed of fiber wound in a circular direction and reinforced in solid material.

12. In a spring mechanism, a resilient ring element, a pair of dished disk members concentrically located within said resilient ring element with their external circumferential edges abutting the internal circumferential wall of said ring element, a bushing member for each of said dished disk members, an annular shoulder on said bushing member, internal circumferential edges of said dished disk members abutting the external circumferential wall of said bushings radially, and end areas of said internal circumferential edges of said dished disk members abutting said annular shoulders axially, means to actuate the dislpacement of said dished disk members axially, by relative movement of said bushings axially, to thereby cause said external circumferential edges of said dished disk members to increase radially to stress said resilient ring element in hoop stress.

13. The invention as claimed in claim 12, in which said pair of dished disk members are mounted in said resilient ring element with their respective external circumferential edges in contact with each other.

14. In a spring mechanism, a bushing member, a resilient ring of uniform radial thickness mounted concentrically with said bushing member, said bushing member slidably mounted on a rod member, a dished disk member with a center hole therein of an internal circumferential edge mounted on said bushing member, with said internal circumferential edge abutting circumferential wall of said bushing member and said dished disk member extending radially to contact said resilient ring in such manner that any force on said bushing member axially will result in radial movement of said dished disk member to stress said resilient ring in hoop stress.

15. In a spring mechanism, a resilient ring, a center member within said resilient ring moveably axially relative to said resilient ring including a reduced circumferential wall, a radial shoulder formed by said reduced circumferential wall, a hole in said center member, a shaft member fitted into said hole to form a sliding fit, structure means supporting said resilient ring concentric to said center member consisting of a frusto-conical ring with an internal circumferential edge tightly fitted on said reduced circumferential wall of said center member, said frusto-conical ring extending radially to an external circumferential edge tightly fitted into the internal circumferential wall of said resilient ring, an end area of said frusto-conical ring at said internal circumferential edge abutting said radial shoulder of said center member axially, relative axial movement of said center member in respect to said resilient ring results in radial movement of said frusto-conical ring to thereby cause an increase in said external circumferential edge of said frusto-conical ring, to stress said resilient ring in hoop stress, an abutment, a radial end surface of said center member spaced a predetermined distance from said abutment to thereby limit said center member axially relative to the hoop stress in said resilient ring.

References Cited in the file of this patent

UNITED STATES PATENTS

| | | |
|---|---|---|
| 2,432,717 | Berger | Dec. 16, 1947 |
| 2,655,935 | Kinzbach | Oct. 20, 1953 |
| 2,776,851 | Heinrich | Jan. 8, 1957 |
| 2,879,986 | Maier | Mar. 31, 1959 |
| 2,948,526 | Maier | Aug. 9, 1960 |

FOREIGN PATENTS

| | | |
|---|---|---|
| 500,476 | Germany | June 21, 1930 |
| 827,144 | Germany | Jan. 7, 1952 |
| 873,800 | France | Apr. 7, 1942 |
| 884,677 | France | May 3, 1943 |

UNITED STATES PATENT OFFICE
CERTIFICATE OF CORRECTION

Patent No. 3,080,160            March 5, 1963

Harry Orner

It is hereby certified that error appears in the above numbered patent requiring correction and that the said Letters Patent should read as corrected below.

Column 1, line 59, before "element" insert -- spring --; column 6, line 49, for "dislpacement" read -- displacement --; line 64, after "abutting" insert -- a --.

Signed and sealed this 1st day of October 1963.

(SEAL)
Attest:

ERNEST W. SWIDER            DAVID L. LADD

Attesting Officer            Commissioner of Patents